US012684038B2

(12) United States Patent
Roy et al.

(10) Patent No.: US 12,684,038 B2
(45) Date of Patent: Jul. 14, 2026

(54) SYSTEMS AND METHODS FOR INTELLIGENT LOAD BALANCING OF HOSTED SESSIONS

(71) Applicant: Citrix Systems, Inc., Fort Lauderdale, FL (US)

(72) Inventors: Vinay George Roy, Bengaluru (IN); Mukesh Garg, Bengaluru (IN); Naman Dubey, Bangalore (IN); Vikramjeet Singh Sandhu, Bangalore (IN); Himanshu Pandey, Bangalore (IN); Rahul Gupta, Bengaluru (IN)

( * ) Notice: Subject to any disclaimer, the term of this patent is extended or adjusted under 35 U.S.C. 154(b) by 163 days.

(21) Appl. No.: 17/954,668

(22) Filed: Sep. 28, 2022

(65) Prior Publication Data
US 2024/0106886 A1     Mar. 28, 2024

(51) Int. Cl.
*H04L 67/1008*     (2022.01)
*H04L 47/125*     (2022.01)
*H04L 67/1029*     (2022.01)

(52) U.S. Cl.
CPC ........ *H04L 67/1008* (2013.01); *H04L 47/125* (2013.01); *H04L 67/1029* (2013.01)

(58) Field of Classification Search
CPC ............. H04L 67/1004; H04L 67/1006; H04L 67/1008; H04L 67/101; H04L 67/1012; H04L 67/1014; H04L 67/1017; H04L 67/1019; H04L 67/102
See application file for complete search history.

(56) References Cited

U.S. PATENT DOCUMENTS

| | | | | |
|---|---|---|---|---|
| 10,523,748 B2 * | 12/2019 | Yang | ................... | H04L 61/4511 |
| 2009/0328050 A1 * | 12/2009 | Liu | ........................ | G06F 9/5088 |
| | | | | 718/104 |
| 2015/0046989 A1 * | 2/2015 | Oberheide | .......... | H04L 63/0876 |
| | | | | 726/6 |
| 2021/0099530 A1 * | 4/2021 | Unnithan | ................ | G06F 9/505 |
| 2021/0136178 A1 * | 5/2021 | Casey | ................... | G06N 20/00 |

* cited by examiner

*Primary Examiner* — Ryan J Jakovac

(57) ABSTRACT

Described embodiments provide systems and methods for intelligent load balancing of hosted sessions. A processor can determine a plurality of metrics for each of a plurality of machines configured to connect client devices with hosted sessions. The processor can receive, from a client device, a request to establish a connection with one of the plurality of machines to access a hosted session. The processor can determine a score for each of the plurality of machines based at least on the plurality of metrics for each of the plurality of machines. The processor can select a machine from the plurality of machines as a function of the score and a resource cost of the machine. The processor can cause the client device to connect to the selected machine for the hosted session.

19 Claims, 9 Drawing Sheets

SYSTEMS AND METHODS FOR INTELLIGENT LOAD BALANCING OF HOSTED SESSIONS

FIELD OF THE DISCLOSURE

The present application generally relates to intelligent load balancing of hosted sessions. In particular, this technical solution can employ a variety of methods to automatically cause client devices to connect to machines for hosted sessions based on metrics and historical data of the machines, users, and hosted sessions launched by the users for improved user experiences.

BACKGROUND

Different machines may provide a cloud service that hosts hosted sessions (e.g., virtual desktop sessions) in which client devices connect with the machines and the machines provide virtual desktops to the connected client devices. Interactions with the hosted machines from a mouse and keyboard provided via a communication protocol to the machines allow users to interact with the virtual desktops despite not being co-located with the machines themselves. Individual machines may host one or more multiple hosted sessions with client devices contemporaneously. However, given the different and/or limited resource capacity between the machines, the user experiences of the hosted sessions may degrade significantly as client devices connect to the machines for hosted sessions.

SUMMARY

This Summary is provided to introduce a selection of concepts in a simplified form that are further described below in the Detailed Description. This Summary is not intended to identify key features or essential features, nor is it intended to limit the scope of the claims included herewith.

Implementations of the systems and methods discussed herein provide for intelligent load balancing of hosted sessions. A server implementing the systems and methods described herein may connect client devices to different machines for hosted sessions to optimize the user experience of the users accessing the hosted sessions. To do so, the server may continuously calculate metrics indicating the expected resource utilization of different machines that are configured to host hosted sessions. Examples of such resource utilization include memory utilization, central processing unit (CPU) utilization, and disk utilization. Upon receiving a request to establish a connection with a machine for a hosted session, the server may retrieve the calculated metrics (e.g., the most recently calculated metrics) for the machine as well as other parameters about the machine, such as the current operating state of the machine, the number of hosted sessions the machine is hosting, and/or the account or application requesting the connection. The server may calculate a score for each of the machines based on the calculated metrics for the respective machines and the parameters. The server may select the machine that is associated with the highest or lowest score, depending on the implementation. The server may cause the client device to connect to the selected machine. The server may repeat this process over time as client devices transmit requests to connect to a machine for hosted sessions. Because the server may calculate the scores for client devices based on characteristics of the individual client devices and/or updated characteristics of the machines hosting hosted sessions, the server may manage the hosted sessions the machines provide to provide an improved user experience compared to conventional systems that may only connect client devices to machines based on single parameters or based on the number of hosted sessions the machines are currently hosting.

In some implementations, the server may use historical data to calculate scores for machines. For example, in addition to the metrics the server calculates for a machine, the server can also use historic data such as historic data of the user, application, and/or client device, and/or historic data for previous sessions the machine hosted, the machine's current and previous hosted sessions (e.g., immediately previous hosted sessions or hosted sessions within a defined time period relative to the current time), and the machine's performance during hosted session the provides for the application and user. The server may input such historical data regarding the user, client device, application, and machine in addition to calculated metrics for the machine into a machine learning model (e.g., a neural network, a support vector machine, random forest, etc.). The server may execute the machine learning model and the machine learning model may output a score for the machine accordingly. The server may similarly calculate scores for each machine using historic data of the user, client device, application, and the respective machine to calculate a score for the machine. In this way, the server may use historical data to calculate scores that better account for how machines function based on different user and application behaviors on hosted sessions the machines provide.

In some implementations, the server may not input historical data of the user into the machine learning model to calculate the score. Instead, the server may train the machine learning model using connection and performance data of connections or the machine's performances during hosted sessions the server provides to the client device accessed by the user and an application identifier, a client device identifier, and/or an account identifier for the user. Consequently, the server may input the application identifier, client identifier, and/or account identifier for the user into the machine learning model to calculate the score for a machine instead of all of the historical data for the user accessing a hosted session provided by the machine.

In some implementations, the server may select the machine to host a hosted session as a function of the resource cost of the machine (e.g., as a function of the resource cost and score of the machine). For example, the server may determine a subset of machines have similar scores between each other (e.g., scores within a threshold or range of each other). The server may select the machine based on the resource costs of hosting the hosted session of each machine in the subset. For instance, different machines may require differing amounts of computer resources (e.g., energy, memory requirements, CPU usage requirements, disk usage requirements, etc.) to host hosted sessions. The server may identify the computer resources that hosting a hosted session would require for each machine in the subset. The server may calculate a resource cost for the machines in the subset based on the identified computer resources (e.g., a resource cost indicating the aggregate computer resources hosting a hosted session would require for multiple computer resources of a machine or a resource cost for each type of computer resource of a machine) for each machine of the subset. The server may calculate the resource cost for each machine by multiplying the computer resources for the machine by a conversion factor and/or by setting the resource cost using rules and according to the computer resource requirements of hosting a hosted session at each machine. The server may select the machine with a score that satisfies a criterion and/or the server may execute an optimization function based on the resource costs and/or scores for the different machines and select the machine that maximizes the optimization function. The server may then cause the client device to connect to the selected machine.

At least one aspect of this technical solution is directed to a method. The method may include determining, by one or more processors, a plurality of metrics for each of a plurality of machines configured to connect client devices with hosted sessions; receiving, by the one or more processors from a client device, a request to establish a connection with one of the plurality of machines to access a hosted session; determining, by the one or more processors, a score for each of the plurality of machines based at least on the plurality of metrics for each of the plurality of machines; selecting, by the one or more processors, a machine from the plurality of machines as a function of the score and a resource cost of the machine; and causing, by the one or more processors, the client device to connect to the selected machine for the hosted session.

In some implementations, determining the plurality of metrics for each of the plurality of machines comprises determining, by the one or more processors, memory utilization, central processing unit utilization, and disk usage utilization for each of the plurality of machines. In some implementations, determining the plurality of metrics for each of the plurality of machines comprises determining, by the one or more processors, metrics for each of the plurality of machines over time at defined intervals; and determining, by the one or more processors, the plurality of metrics at an interval of the defined intervals.

In some implementations, determining the score for each of the plurality of machines based on the plurality of metrics comprises determining, by the one or more processors, the score for each of the plurality of machines based on the plurality of metrics responsive to the plurality of metrics being determined at a most recent interval of the defined intervals. In some implementations, determining the plurality of metrics comprises determining, by the one or more processors, the plurality of metrics based on a current time of the day and historical user activity at the current time of the day. In some implementations, determining the score for each of the plurality of machines comprises determining, by the one or more processors, the score based further on an account identifier of an account accessing the client device that transmitted the request.

In some implementations, determining the score for each of the plurality of machines comprises determining, by the one or more processors, the score based further on an application identifier of an application executing on the client device that transmitted the request to establish the connection. In some implementations, selecting the machine comprises selecting, by the one or more processors, the machine responsive to determining the score and the resource cost of the machine optimizes an optimization function. In some implementations, the method may further include determining, by the one or more processors, a subset of the plurality of machines with scores that are below a threshold; and removing, by the one or more processors, the subset of the plurality of machines as options from which to select prior to selecting the machine.

In some implementations, the method may further include determining, by the one or more processors, a second plurality of metrics for each of the plurality of machines;

receiving, by the one or more processors from a second client device, a second request to establish a connection with one of the plurality of machines to access a hosted session; determining, by the one or more processors, a second score for each of the plurality of machines based on the second plurality of metrics for each of the plurality of machines; determining, by the one or more processors, each of the second scores is below a threshold; and responsive to determining each of the second scores is below the threshold, transmitting, by the one or more processors, an alert to an administrator device indicating each of the second scores is below the threshold. In some implementations, the plurality of machines are a subset of a set of machines configured to host sessions, further comprising identifying, by the one or more processors, the plurality of machines from the set of machines responsive to each machine of the plurality of machines corresponding to a score within a threshold of each other, wherein selecting the machine from the plurality of machines as a function of the score and the resource cost of the machine comprises selecting, by the one or more processors, the machine as a function of the resource cost of the machine responsive to determining the plurality of machines correspond to scores within the threshold of each other.

In some implementations, selecting the machine comprises assigning, by the one or more processors, resource costs of zero to a subset of the plurality of machines responsive to each machine of the subset currently hosting a hosted session; and calculating, by the one or more processors, a resource cost for each machine of the plurality of machines other than the subset assigned the resource costs of zero based on machine specifications of computing devices executing each machine of the plurality of machines other than the subset. In some implementations, determining the score for each of the plurality of machines comprises concatenating, by the one or more processors, the plurality of metrics, an account identifier of an account accessed at the client device that transmitted the request, and an application identifier of a first application executing on the client device that transmitted the request to generate a feature vector; and executing, by the one or more processors, a machine learning model using the feature vector as input to determine the score for each of the plurality of machines.

At least one aspect of this technical solution is directed to a system. The system may include a computing device comprising a processor coupled to memory and a network interface. The one or more processors may be configured to determine a plurality of metrics for each of a plurality of machines configured to connect computers with hosted sessions; receive, from a client device, a request to establish a connection with one of the plurality of machines to access a hosted session; determine a score for each of the plurality of machines based at least on the plurality of metrics for each of the plurality of machines; select an machine from the plurality of machines as a function of the score and a resource cost of the machine; and cause the client device to connect to the selected machine for the hosted session.

In some implementations, the processor is configured to determine the plurality of metrics for each of the plurality of machines by determining memory utilization, central processing unit utilization, and disk usage utilization for each of the plurality of machines. In some implementations, the processor is configured to determine the plurality of metrics for each of the plurality of machines by determining metrics for each of the plurality of machines over time at defined intervals; and determining the plurality of metrics at an interval of the defined intervals. In some implementations, the processor is configured to determine the score for each of the plurality of machines based on the plurality of metrics by determining the score for each of the plurality of machines based on the plurality of metrics responsive to the plurality of metrics being determined at a most recent interval. In some implementations, the processor is configured to determine the plurality of metrics by determining the plurality of metrics based on a current time of the day and historical user activity at the current time of the day.

At least one aspect of this technical solution is directed to a method. The method may include determining, by one or more processors processor, a plurality of metrics for each of a plurality of machines configured to connect client devices with hosted sessions; receiving, by the one or more processors from a client device, a request to establish a connection with one of the plurality of machines to access a hosted session; determining, by the one or more processors, a score for each of the plurality of machines based on the plurality of metrics for each of the plurality of machines; selecting, by the one or more processors, an machine from the plurality of machines as a function of the score for the machine; and causing, by the one or more processors, the client device to connect to the selected machine for the hosted session. In some implementations, determining the plurality of metrics for each of the plurality of machines comprises determining memory utilization, central processing unit utilization, and disk usage utilization for each of the plurality of machines.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for intelligent load balancing of hosted sessions.

A. Network and Computing Environment

Figure 1A:
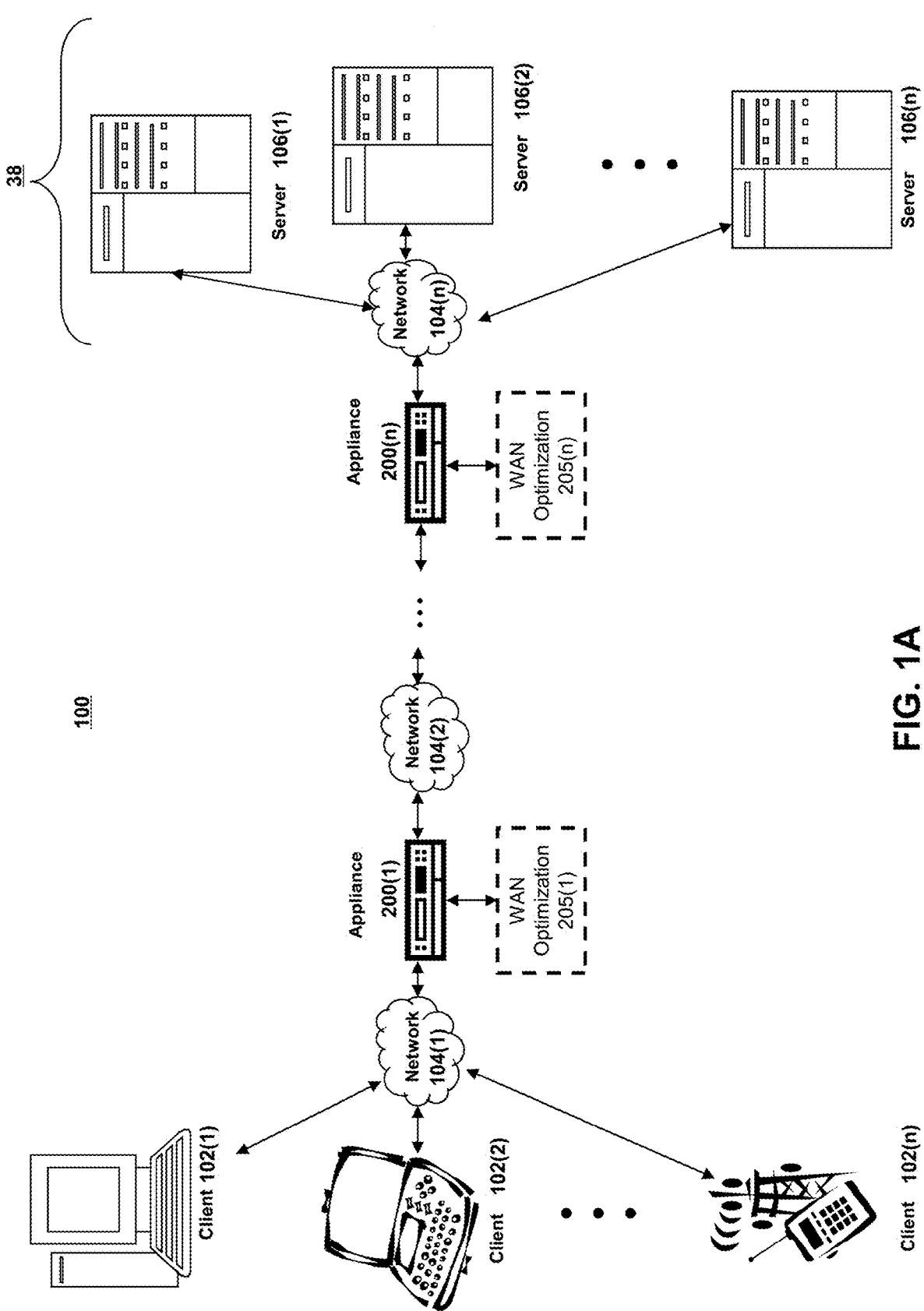
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some implementations, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some implementations, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some implementations, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some implementations, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
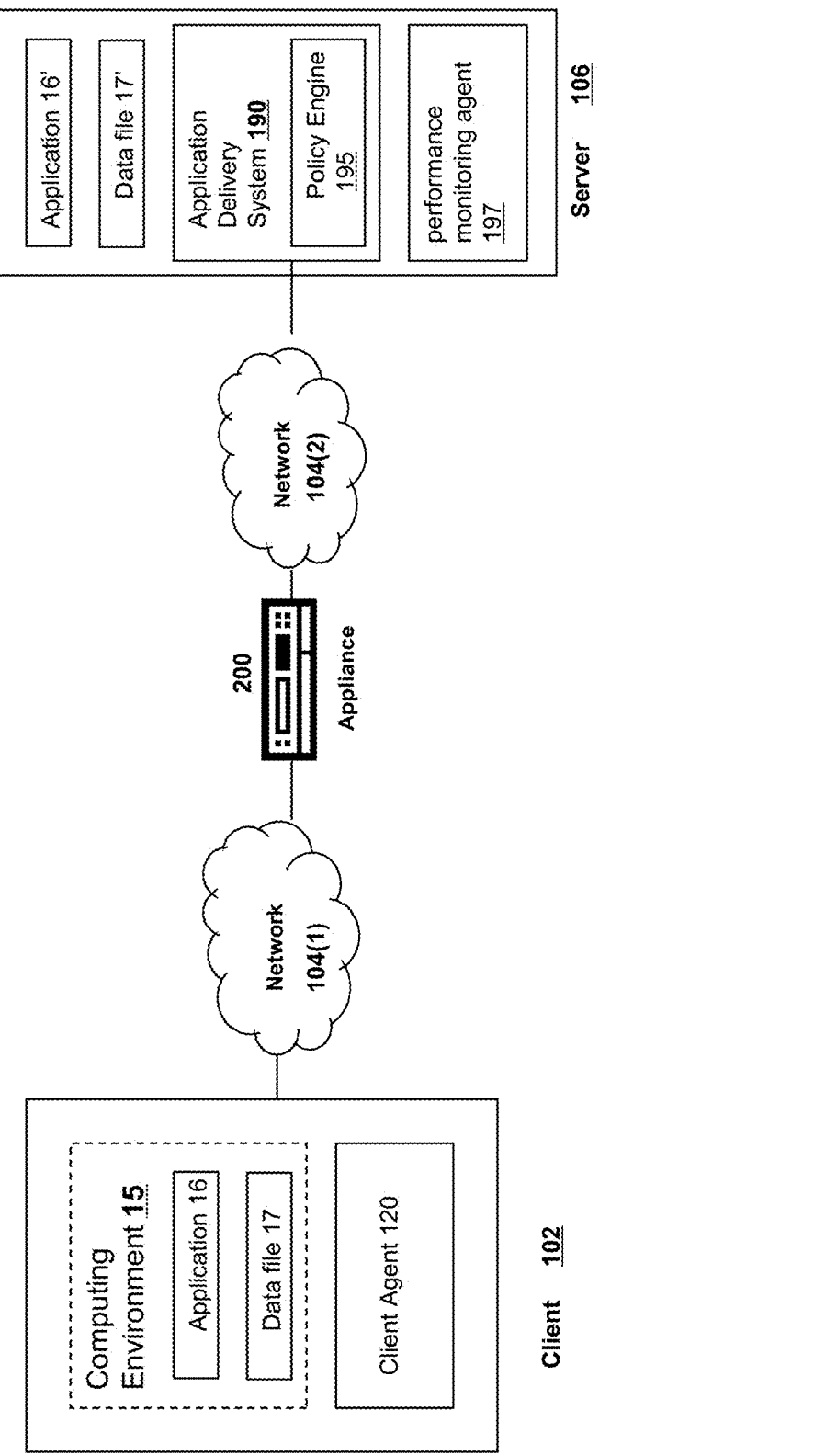
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix DaaS™ (formerly Citrix Virtual Apps and Desktops, XenApp®, and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client agent 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some implementations, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some implementations, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some implementations, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents 120 and 197 may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
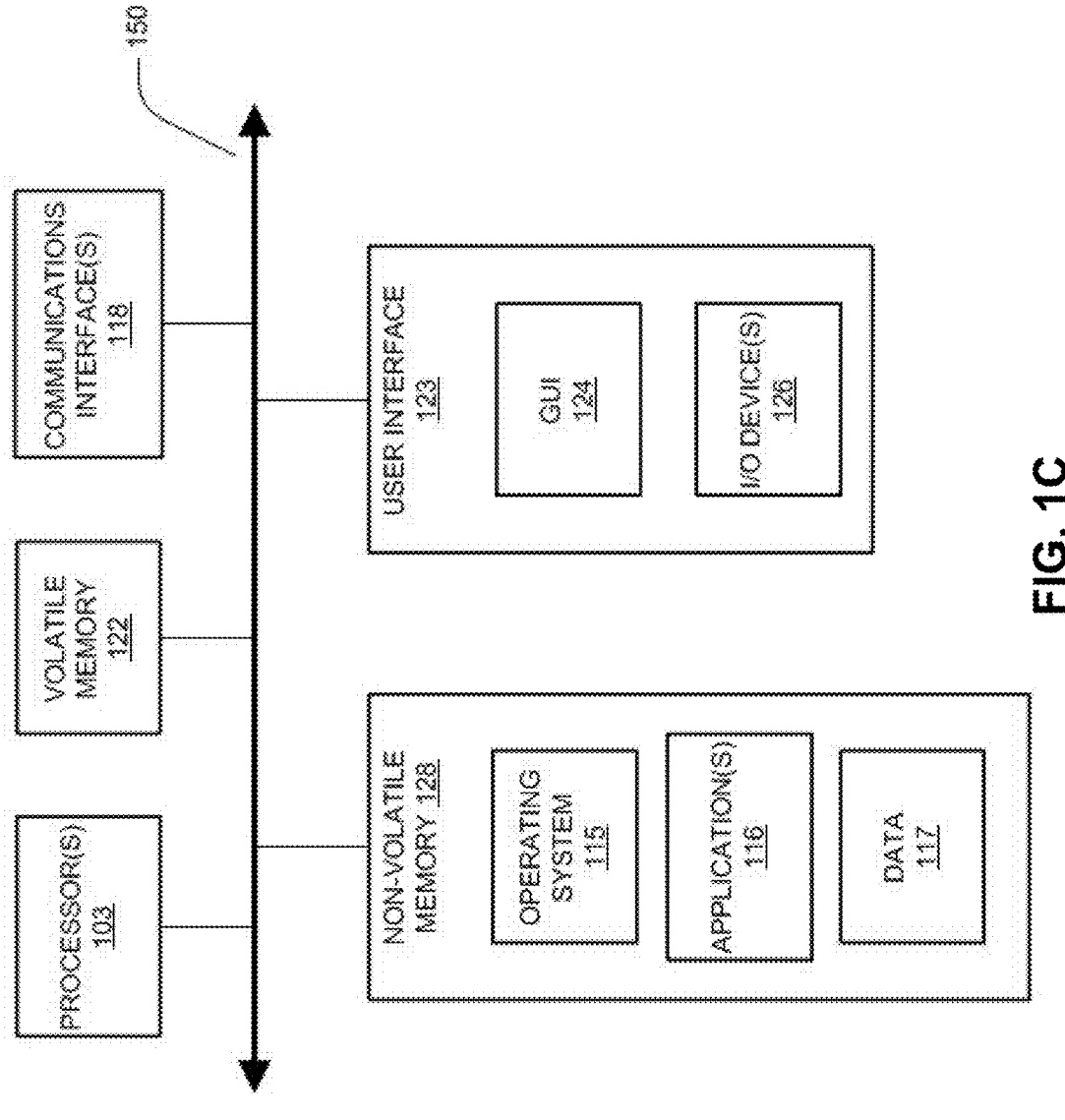
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some implementations, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, computer 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
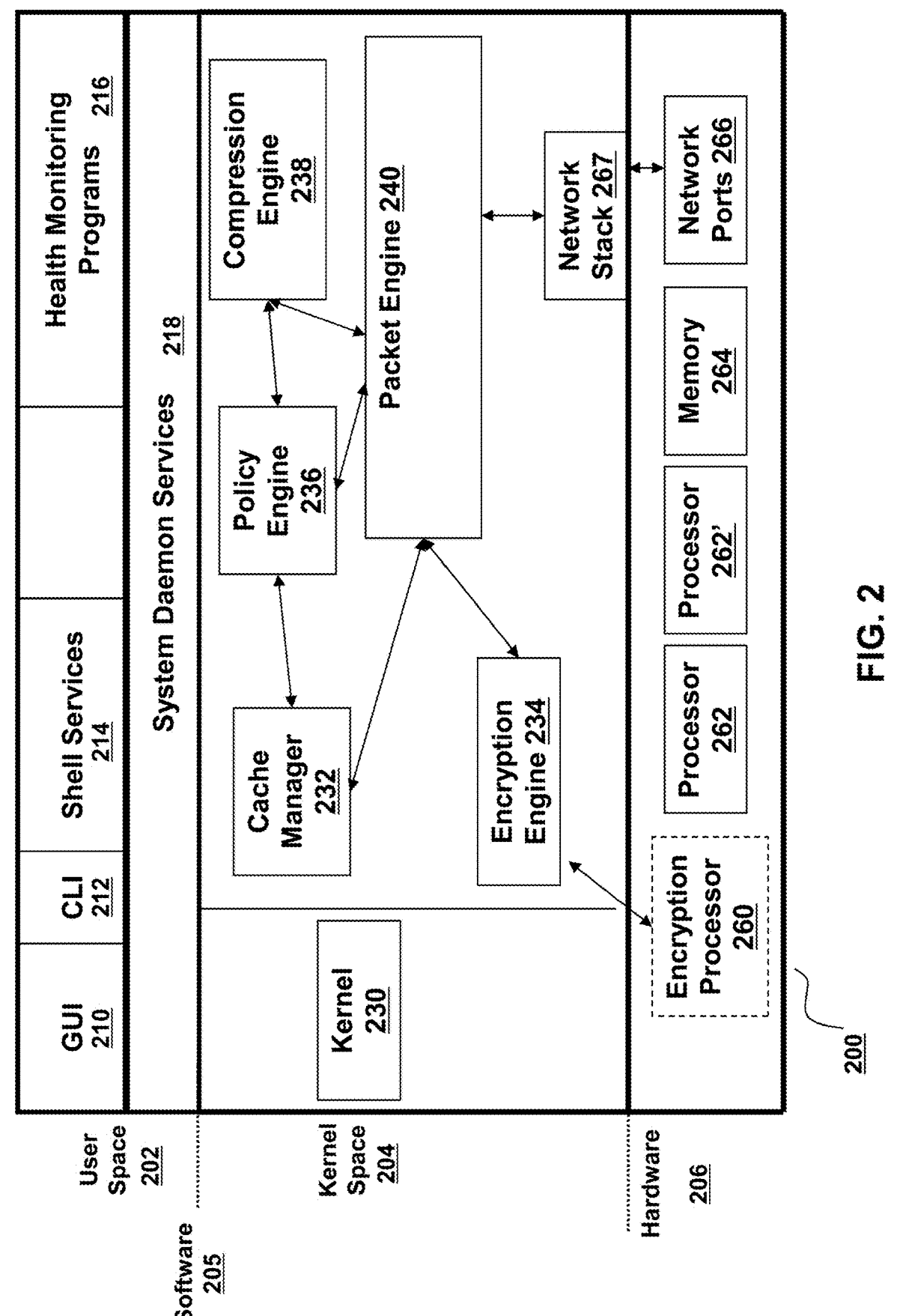
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 16. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some implementations, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some implementations, encryption engine 234 may use a tunneling protocol to provide a VPN between a client 102 and a server 106. In some implementations, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some implementations, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some implementations, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some implementations, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some implementations, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, FL. In an illustrative embodiment, device 302 executing a hypervisor that creates a virtual machine platform on which guest operating systems may execute is referred to as a host server.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some implementations, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some implementations, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
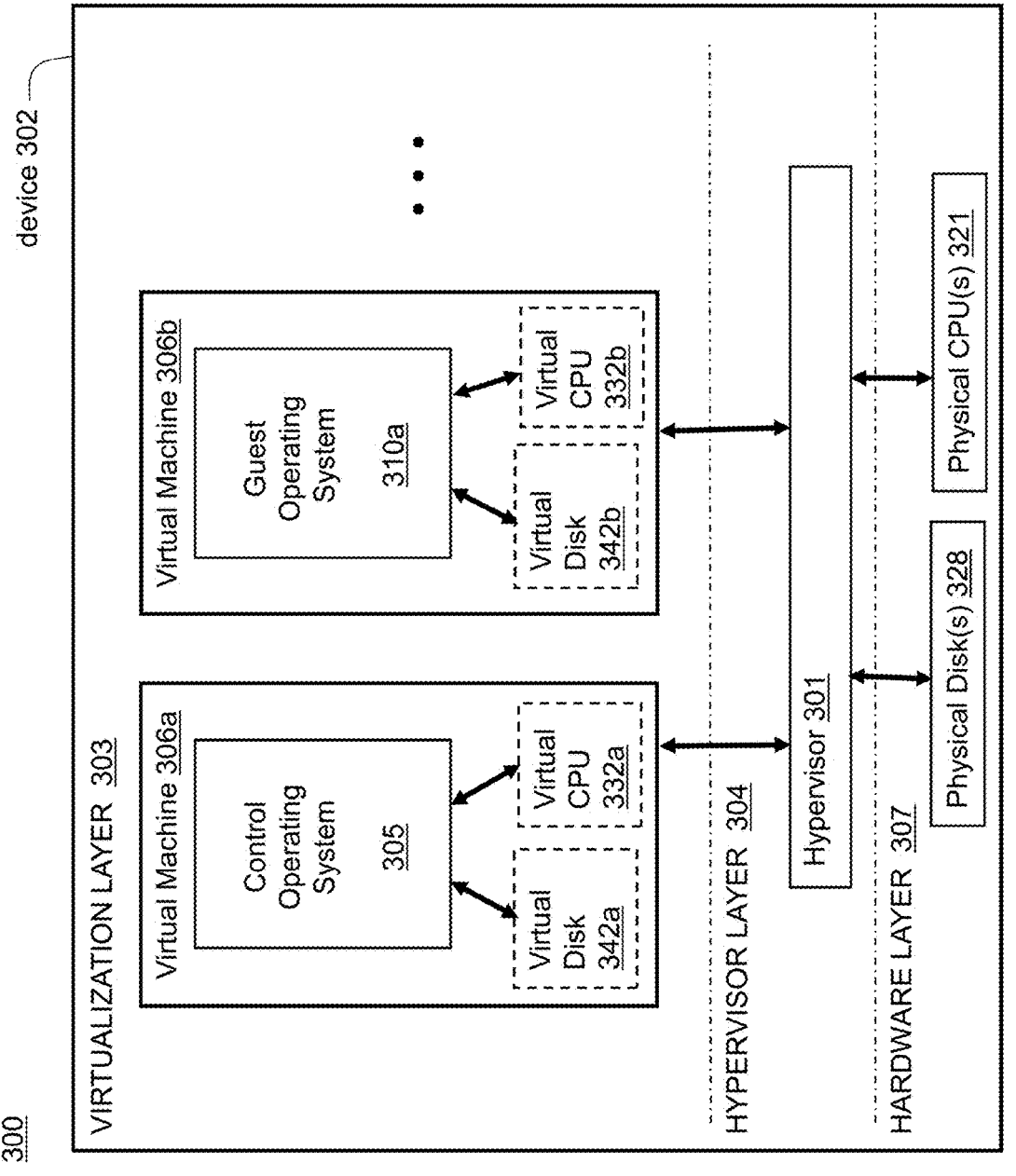
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, FL, the teachings of which are hereby incorporated herein by reference.

In some implementations, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some implementations, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, FL, the teachings of which are hereby incorporated herein by reference.

D. Systems and Methods for Providing a Distributed Cluster Architecture

Figure 4:
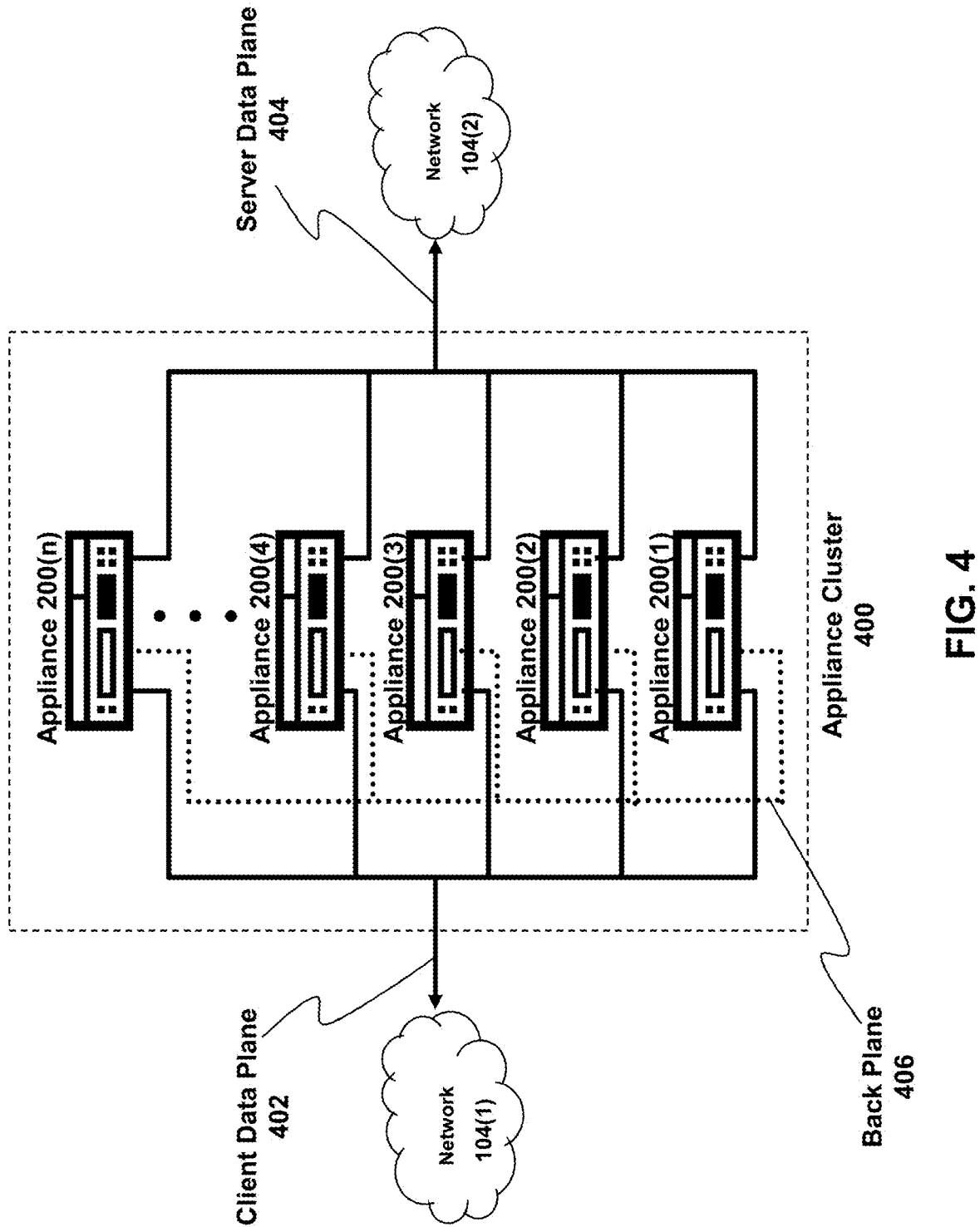
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some implementations, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some implementations, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some implementations, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some implementations, client data plane 402 and server data plane 404 may be merged or combined into a single device.

In some implementations, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some implementations, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, FL, the teachings of which are hereby incorporated herein by reference.

E. Intelligent Load Balancing of Hosted Sessions

As previously mentioned, client devices may transmit requests to connect to machines (e.g., hosting machines) for hosted sessions (e.g., hosted virtual desktop sessions). The machines may provide the hosted sessions via a virtual delivery agent (VDA). Different machines may provide a cloud service that hosts such hosted sessions. The machines may each have different resource capacities and/or processing efficiencies (e.g., one machine may require more random access memory (RAM) to host a hosted session than another machine). Further, the different machines may perform differently based on the number of hosted sessions they are hosting, which can hamper the user experience between different hosted sessions on a single machine as the machine establishes more hosted sessions over time. In one example, one machine may have more RAM than another machine. Accordingly, the machine with more RAM may be able to provide a better user experience for hosted sessions than the other machine, even in cases in which the machine with more RAM is already hosting one or more hosted sessions. The difference in user experience may indicate a low round-trip time or other causes of latency (e.g., host delay or DC latency) in hosted sessions provided by the machine with lower RAM.

Additionally, different users may use the hosted sessions provided by the machines differently. The different usage patterns may cause different machines with different resource capacities and/or current resource usage to provide better user experiences to different users. For example, a user who accesses hosted sessions primarily to check their email may use different computer resources than a user who accesses hosted sessions to access a video editing tool. Accordingly, a machine that has more computer resources that are required to access an email server and provide access to an email application may be optimal for the user that primarily accesses hosted sessions to access email and a machine that has more computer resources that are required to execute video editing software may be optimal for the other user.

Conventional systems may not be able to route hosted sessions to client devices based on expected user experiences of the hosted sessions. For example, a conventional system may not have access to or otherwise use computer resource data of machines that host hosted sessions or data indicating typical user hosted session usage. Such systems may not consider user experience quality when selecting a machine to connect to a client device. Instead, conventional systems may cause client devices to connect to any machines that have not reached a connection capacity or have a low load index. In some instances, a system may pseudo-randomly assign the client devices to connect with machines. In one example, a computer may select a machine to provide a hosted session that has an application that is currently failing because the machine has a low load index compared with other machines. The computer may select the machine without taking into account load or resource requirements or the capacity of the machine. In another example, a machine could be providing a bad user experience (e.g., a hosted session with high latency or high round-trip time) due to network issues. The computer may still select the machine as opposed to another machine that has the resource capacity to host another hosted session because the machine with the higher resource capacity may have a higher load index. Thus, conventional systems may select suboptimal machines to provide hosted sessions. The selection may result in a large number of errors or faults as the machines attempt to host hosted sessions that the machines do not have the computer resources to host.

A server implementing the systems and methods discussed herein may overcome the aforementioned technical deficiencies. The server can intelligently decide and route connection requests from client devices to different machines for hosted sessions. The server may do so based on the correlation of the machines with historical usage of users of hosted sessions that the machines provide and the current and recent status of the machines. The server may analyze historical data of hosted session usage by different users and the machine specifications of the machines to select the machines that are expected to provide the best user experience and will consume the least amount of resources for the hosted sessions and the users. The server may route connection requests to different machines using these processing techniques. Accordingly, the server may cause client devices requesting connections to connect to the machines that will provide hosted sessions with high quality user experiences.

To select a machine to host a hosted session for a client device, the server may use a cascading machine learning technique. For example, the server may monitor the machines and/or connections the machines have with various client devices. In doing so, the server may collect parameters regarding how different users use the hosted sessions provided by the machines at different times, the resource usage at those times, and other parameters indicating how the machines are used or performing when hosting hosted sessions. Based on the parameters, the server may execute separate machine learning models at set intervals of time to calculate metrics for the machines. Examples of such metrics include expected memory utilization, expected CPU utilization, and expected disk utilization. The metrics may indicate expected values for the different characteristics for a following interval of time or a previous interval of time from the time in which the server is calculating the metrics. Upon receiving a connection request from a client device, the server may use data regarding the requesting user and computer in combination with the calculated metrics and other parameters indicating how the different machines perform as input to another machine learning model. Based on the inputs, the machine learning model may output scores (e.g., user experience scores on a defined scale, such as from 1-100) for the machines. The server may select the machine with the highest score. The server may cause the client device that requested the hosted session to connect with the selected machine to access a hosted session provided by the selected machine.

In some implementations, instead of selecting the machine based solely on the score, the server may select the machine to optimize resource usage of the hosting machines (e.g., across machines owned or accessed by a tenant or an organization). The server may do so while maintaining a high level of user experience with hosted sessions. For example, the server may identify scores for machines that exceed a threshold (e.g., identify machines that will provide at least a minimum level of user experience quality). The server may identify the machines that correspond to the scores and retrieve the specifications for the machines that indicate the resource cost of running the machines to host hosted sessions. The server may identify the machine with the lowest resource cost of the machines with the scores that exceed the threshold. The server may select the identified machine. The server may cause the client device to connect with the selected machine.

Figure 5:
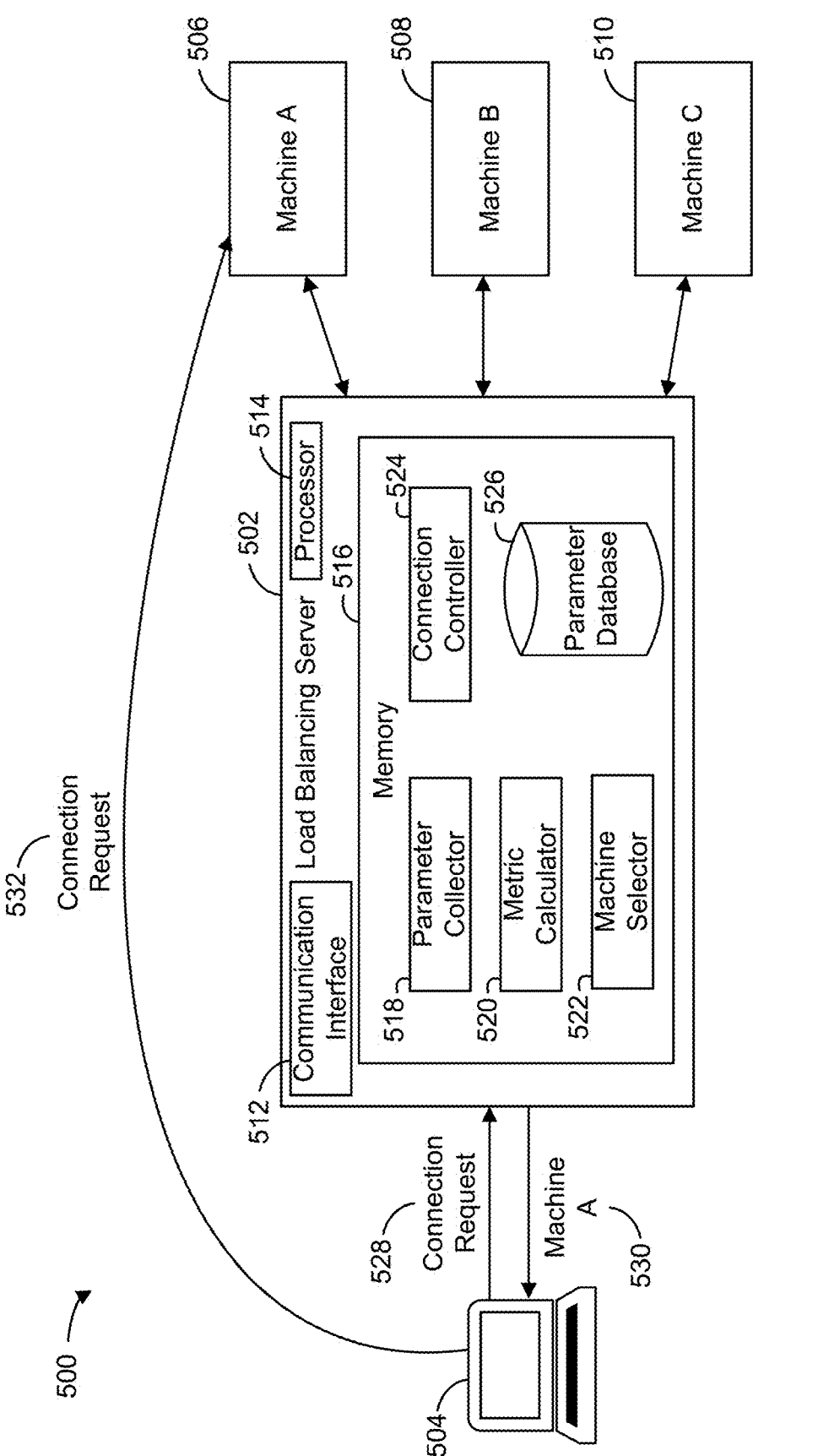
FIG. 5 is a block diagram of a system intelligent load balancing of hosted sessions, in accordance with an illustrative embodiment.

Referring now to FIG. 5, a block diagram of a system 500 for intelligent load balancing of hosted sessions, in accordance with an illustrative embodiment. The system 500 may include the same or similar components to the components of the sequence 700. The system 500 is shown to include a load balancing server 502 in communication with a computing device 504, and machines 506, 508, and 510. The load balancing server 502 may communicate with the client device 504 and the machines 506, 508, and 510 over a network. The client device 504 may be similar to or the same as the client 102 and the network may be similar to or the same as the network 104. The machines 506, 508, and 510 may provide access to hosted applications to client devices (e.g., the client device 504). The machines 506, 508, and 510 may be the same as or similar to the appliance 200. The machines 506, 508, and 510 may be owned or accessed by a single tenant or organization. The load balancing server 502 may monitor individual connections or communication sessions between the machines 506, 508, and 510 and client devices. The machines 506, 508, and 510 and/or client devices in communication with the machines 506, 508, and 510 may provide connection or operational characteristics to a monitoring server and/or the load balancing server 502 for analysis and error mitigation.

The load balancing server 502 may include a communication interface 512, a processor 514, and a memory 516. The communication interface 512, the processor 514, and the memory 516 may comprise any of the various communications interfaces, processors, and memory devices described above. Although shown as a single server, the load balancing server 502 may comprise a plurality of servers, such as a server farm, a cloud of virtual machines executed by one or more physical machines, or other types or forms of computing devices. For example, the load balancing server 502 can be a set of containers or pods in a Kubernetes environment or cluster.

The memory 516 may include a parameter collector 518, a metric calculator 520, a machine selector 522, a connection controller 524, and a parameter database 526, in some implementations. The parameter collector 518, metric calculator 520, machine selector 522, connection controller 524, and parameter database 526 may run or execute as services within a Kubernetes cluster, in some implementations. The components 518-526 may operate together to use a variety of techniques to automatically load balance hosted sessions between machines (e.g., the machines 506, 508, and 510) and/or applications (e.g., virtual desktop agents (VDAs)) executing on such machines. The components 518-526 may do so to reduce errors and improve performance of the applications and/or the user experience of the hosted sessions. For example, responsive to receiving a connection request for a hosted session from a client device, the components 518-526 may automatically select a machine to connect to the client device for an optimal hosted session. The components 518-526 may then cause the client device to connect to the selected machine for a hosted session.

The parameter collector 518 may comprise instructions executable by one or more processors (e.g., the processor 514) that cause the processors to receive monitored data (e.g., in the form of data packets) from the machines 506-510. The parameter collector 518 may be or include a monitoring server. The parameter collector 518 may create data sets (e.g., vectors) that can be used to detect errors and other characteristics of the monitored data. The monitored data may include values for performance metrics or performance characteristics of different machines and/or hosted sessions provided by the machines to client devices (e.g., applications of client devices). Examples of parameters include machine parameters regarding the state, resources, or characteristics of the machine such as deviceID/machineID (e.g., an identification of the machine providing the hosted session), broker load index (e.g., an indication of the total resources a machine is currently using to provide one or more hosted sessions), operating system, free disk space, free central processing unit space, free memory, number of users logged into the machine, DC latency of the machine in the past one hour, if available, host delay of the machine in the past one hour, if available, previous session success status (e.g., a flag representing whether the last session was a failure. The flag may be stored in memory for the last four (or any number) sessions as four (or any number) columns), previous session failure code (e.g., an indication of whether a session was a failure. The parameter collector 518 may store such indications for the last four (or any number) sessions as four (or any number) columns), failure of hosted sessions in the last four (or any number) sessions, average memory taken by hosted sessions for a previous defined time period (e.g., the last thirty days), average CPU utilization by hosted sessions at the machine for a previous defined time period (e.g., the last thirty days), value of memory utilization by the machine in a previous time period, number of applications currently running, identifications of the applications that are currently running (e.g., identifications of a defined number of applications that are currently using the most computer resources), identifications of a defined number of users or accounts that are using the most computer resources, etc. Other examples of parameters include application parameters indicating parameters about the application, account (e.g., user), and/or device requesting a hosted session, such as userID (e.g., an identification of an account accessing the hosted session) and/or applicationID/name (e.g., an identification of an application accessing the hosted session). The parameter collector 518 may collect machine parameters at different times of the day and/or for different days of the week and label the collected parameters with labels indicating the times and/or days in which the parameters were collected and/or the parameters were generated. The parameter collector 518 may collect application parameters from the data of connection requests for hosted sessions.

The parameters that the parameter collector 518 collects can enable the load balancing server 502 to balance the load of hosting hosted sessions across the machines to provide improved user experiences for hosted sessions provided by the machines. The parameter collector 518 can store the parameters in the parameter database 526 (e.g., a relational database or a service executed by the load balancing server 502). The parameter collector 518 can label the collected parameters based on the times and/or days in which the parameters were collected and/or generated prior to or after storing the parameters in the parameter database 526.

The parameter collector 518 may use the timestamps to identify parameters to use to select machines to provide hosted sessions. For example, to select a machine to which to route a connection request for a client device, the load balancing server 502 may retrieve parameters generated within a most recent defined time interval (e.g., a time interval of the last two hours). The load balancing server 502 may then use the retrieved parameters to select the machine to route the connection request of the client device. In this way, the load balancing server 502 may route connection requests to machines based on data indicating the resources and current states of the machines.

The parameter collector 518 may retrieve parameters for individual users and/or applications accessing hosted sessions on machines. To do so, when retrieving or receiving parameters regarding hosted session, a machine hosting a hosted session, or a connection between the machine and a client device, the parameters collector 518 may additionally retrieve or receive identifiers of the users (e.g., account identifiers that corresponds to the users) and/or the applications the users are using to access hosted sessions provided by the machines. The parameter collector 518 may retrieve or receive such identifiers from the machines in the same messages the machine transmits to the parameter collector 518 with machine or application parameters the machines transmit. The parameter collector 518 may store the machine or application parameters in the parameter database 526 with account and/or application identifiers to indicate the parameters correspond with the user or application accessing the hosted session. Accordingly, the parameter collector 518 may store indications of how different users use the hosted sessions and the computing resources the user incur on the machines during hosted sessions, which may differ depending on the applications the users access during the hosted sessions and/or how the users use the applications.

The parameter collector 518 may collect the aforementioned parameters from different machines (e.g., the machines 506-510, such as different machines that are owned by a common tenant) by monitoring the machines and/or the connections the machines have with client devices for which the machines are hosting hosted sessions. The parameter collector 518 may do so by transmitting requests for parameters to the machines (e.g., transmit requests through one or more application programming interfaces (APIs)). The parameter collector 518 may transmit the requests at defined intervals and/or upon receiving a connection request from a client device (e.g., the client device 504). The machines that receive the requests may transmit the parameters back to the parameter collector 518. The parameter collector 518 may receive the parameters from the machines and store the received parameters in the memory 516. For instance, the parameter collector 518 may store the received parameters in the parameter database 526. The parameter collector 518 may similarly retrieve parameters from any number of machines.

In some implementations, the machines may generate and store parameters for the individual machines and/or the connections the machines have to provide hosted sessions to client devices. For example, over time, the machines 506-510 may monitor performance of hosted sessions the machines 506-510 provide. In doing so, the machines 506-510 may generate different parameters of the resource usage of the machines 506-510 and/or the connections the machines 506-510 have with client devices. The machines may monitor and generate such parameters at set intervals or upon receiving a user input. The machines 506-510 may store the generated parameters in memory. Accordingly, when a machine of the machines 506-510 receives a request from the parameter collector 518 for parameters, the machine may retrieve the generated parameters from memory and respond to the request with a message including the retrieved parameters. In some implementations, the machines 506-510 may automatically transmit generated parameters to the load balancing server 502 upon generating the parameters.

In some implementations, the machines 506-510 may have connectors that automatically publish new parameter values to an external monitoring system (e.g., a monitoring system of the load balancing server 502, such as the parameter collector 518). The parameter collector 518, the metric calculator 520, and/or the machine selector 522 can pull/query metrics from the monitoring system periodically to proceed with needed calculations.

In some implementations, the parameter collector 518 may transmit the requests for parameters upon receiving a connection request for a hosted session. The parameter collector 518 may receive the connection request across a network from the client device 504. The parameter collector 518 may receive the connection request 528 in a data packet. Upon receiving the connection request 528, the parameter collector 518 may transmit requests for parameters to the machines 506-510. The machines 506-510 may receive the requests and retrieve parameters (e.g., the requested parameters) from memory and transmit the parameters back to parameter collector 518.

The metric calculator 520 may comprise instructions executable by one or more processors (e.g., the processor 514) that cause the processors to calculate metrics for the machines 506-510. The metrics may be values for the expected memory load at a machine, expected CPU load at a machine, and/or expected disk load at a machine. The metric calculator 520 may calculate the metrics for or at defined time intervals (e.g., every 30 minutes, every hour, every two hours, every five hours, every day, etc.).

The metric calculator 520 may calculate the metrics for a machine based on parameters for the machine that have timestamps during the defined intervals. For example, if an interval is between 1 PM and 3 PM, the metric calculator 520 can retrieve parameters for a machine with timestamps between 1 PM and 3 PM and calculate the metrics for the time interval based on the collected parameters with the timestamps. In this example, the metrics may be expected resource utilization for a time interval from 3 PM to 5 PM. In some implementations, the metric calculator 520 may retrieve the parameters for the time interval multiple times within a time period. Continuing with the example above, the metric calculator 520 may retrieve parameters from 1 PM to 3 PM every day for the past 30 days (or any number of days or another time period). The metric calculator 520 can calculate the metrics for the machine based on the retrieved parameters.

The metric calculator 520 may execute one or more machine learning models to calculate metrics (e.g., expected memory utilization, expected CPU utilization, and/or expected disk utilization) for a machine (or each machine). Examples of such machine learning models include neural networks (e.g., deep neural networks), random forests, support vector machines, etc. The metric calculator 520 may include ensemble models. In some implementations, the metric calculator 520 may execute individual machine learning models that have each been trained to calculate a different metric. For example, the metric calculator 520 may execute a first machine learning model using the collected parameters from a time interval to calculate an expected memory utilization for the time interval or a subsequent time interval. In doing so, the metric calculator 520 may generate a feature vector using a median value of memory utilization for the time interval from the collected memory utilization values for the time interval (e.g., using data from the time interval of each day of a defined time period, such as the time interval from 1 PM to 3 PM every day for the past 30 days), the median value of memory utilization from the immediately previous time interval (e.g., if the time interval is from 1 PM to 3 PM, the median value of memory utilization at the machine for a time interval from 11 AM to 1 PM), the number of hosted sessions the machine is currently hosting, identifications of a defined number of the applications that are currently utilizing the most memory, identifications of a defined number of accounts (e.g., users) that are connected to host sessions provided by the machine that are utilizing the most memory, an identification of the current day of the week, an identification of the time interval, and/or the current date. The metric calculator 520 may retrieve and/or calculate such parameters and concatenate the parameters into a feature vector. The metric calculator 520 may insert the feature vector into the first machine learning model and execute the machine learning model to calculate a memory utilization metric for the machine. In this way, the metric calculator 520 may use historical user activity data (e.g., historical user memory utilization) at the current time of day and within the defined interval to calculate a memory utilization metric.

In some implementations, the metric calculator 520 may use the identifications of the accounts and/or users to retrieve further data about the accounts or users. For example, the metric calculator 520 may identify the identifications of the users and/or accounts that are currently accessing hosted sessions by the machines 506-510. In some implementations, the metric calculator 520 may use the identifications to query the parameter database 526 for parameters regarding memory utilization of hosted sessions for the different accounts and/or applications. The metric calculator 520 may retrieve the memory utilizations (e.g., the memory utilization values) for a defined number of the accounts and/or applications that correspond to the highest memory utilization (e.g., highest average or median memory utilization, which the metric calculator 520 may calculate from memory utilization parameters for the accounts and/or applications specifically for the time interval for which the metric calculator 520 is calculating the memory utilization metric or for all time intervals) from the parameter database 526. The retrieved or calculated memory utilization for the defined number of accounts and/or applications may be used as input into the first machine learning model to produce the expected memory utilization for a machine for a requested hosted session (e.g., an expected memory utilization for a machine for the next time interval). In some implementations, the metric calculator 520 may not retrieve the memory utilization of the accounts and/or applications. Instead, the metric calculator 520 may insert the identifications of the accounts and/or applications into the feature vector. In such implementations, the first machine learning model may have been trained according to training data that includes such identifiers. Accordingly, the metric calculator 520 may retrieve historical user activity data for the users that are currently accessing hosted sessions. The metric calculator 520 may predict expected memory utilization based on the typical memory utilization of the users that are currently connected to a machine.

The metric calculator 520 may similarly calculate CPU utilization and/or disk utilization metrics for the machine using machine learning models. For example, the metric calculator 520 may calculate a CPU utilization metric for the machine using a second machine learning model. The metric calculator 520 may generate a feature vector using similar parameters to the parameters the metric calculator 520 used to calculate the memory utilization metric except using CPU utilization parameters instead of memory utilization parameters (e.g., the metric calculator 520 may calculate a median CPU utilization for the interval instead of a median memory utilization, accounts or applications that have the highest CPU utilization instead of memory utilization, etc.) in addition to the parameters of the current operation of the machine and other parameters (e.g., the number of hosted sessions the machine is currently hosting, a day of the week, an identification of the time interval, etc.). The metric calculator 520 may execute the second machine learning model with the feature vector to calculate a CPU utilization metric for the machine. The metric calculator 520 may similarly calculate a disk utilization metric for the machine using a third machine learning model by executing the third machine learning model with similar parameters for disk utilization and other corresponding parameters. The metric calculator 520 may similarly calculate memory utilization, CPU utilization, and disk utilization metrics for any number of machines that are configured to host hosted sessions for client devices.

The metric calculator 520 may calculate metrics for machines at defined time intervals. For example, the metric calculator 520 may calculate metrics for machines every hour, every two hours, every five hours, every day, etc. In doing so, the metric calculator 520 may retrieve historical values of parameters for the following or the prior time interval to generate feature vectors for the three machine learning models. The metric calculator 520 may execute the machine learning models with the three feature vectors to generate metrics for expected memory utilization, expected CPU utilization, and/or expected disk utilization metrics. The metric calculator 520 may store and maintain an internal clock and interrupts that cause the metric calculator 520 to calculate the metrics at each time interval. The metric calculator 520 may store each calculated metric in the memory 516 (e.g., in the parameter database 526). The metric calculator 520 may store time stamps with the metrics to indicate the intervals for which the metrics were calculated.

The machine selector 522 may comprise instructions executable by one or more processors (e.g., the processor 514) that cause the processors to select one of the machines 506-510 based on the parameters and/or metrics for the machines. The machine selector 522 may select the machine by calculating a score (e.g., a score indicating a predicted user experience quality for a hosted session hosted by the respective machine) for each of the machines 506-510. The machine selector 522 may compare the scores for the machines with each other and select the machine with the highest (or the lowest, depending on the implementation) score to connect with the client device 504 for a hosted session.

The machine selector 522 may calculate the scores for the machines 506-510 using a machine learning model. The machine learning model may be a neural network, a random forest, a support vector machine, a regression model, a deep neural network, etc. In cases in which the machine learning model is a deep neural network, the neural network may include dropout layers to avoid over fitting. Upon receiving the connection request 528, the machine selector 522 may retrieve application parameters from the connection request 528, machine parameters the parameter collector 518 collected from the machines 506-510, machine parameters from the parameter database 526, and/or metrics the metric calculator 520 calculated (e.g., metrics the metric calculator 520 most recently calculated (e.g., the metrics calculated for the most recent time interval)). In one example, the metric calculator 522 may label the metrics the metric calculator 520 calculates with time stamps indicating the current time or the time interval for which the metric calculator 520 calculated the metrics. The machine selector 522 may retrieve the most recently calculated metrics by retrieving the metrics that correspond to the latest time stamps of the timestamps. The machine selector 522 may generate a feature vector from the retrieved parameters and/or metrics (e.g., concatenate the values into a feature vector). In one example, the metric calculator 520 can concatenate the metrics, an account identifier of an account accessed at the client device that transmitted the request, an application identifier of an application executing on the client device that transmitted the request, and/or other parameters as described above to generate a feature vector. The machine selector 522 may similarly generate feature vectors for each of the machines 506-510 using machine parameters and/or metrics for each machine and the application parameters included in the connection request. The machine selector 522 may execute a machine learning model (e.g., a scoring machine learning model) to calculate scores for the different machines 506-510. In this way, the machine selector 522 may use historical user data to calculate scores for the different machines 506-510 to use to select a machine for a hosted session.

The machine learning model of the machine selector 522 may be trained based on historical data of machines (e.g., the machines 506-510), accounts, and/or the applications that accessed hosted sessions provided by the machines. The training data may include data points corresponding to a given time period. For example, the machine learning model may be trained using supervised training techniques with scores as labels. The machine selector 522 may calculate the session scores based on an average (e.g., a weighted average) of different parameters and/or metrics. One such parameter may be ICA round-trip-time (ICA RTT), which could be affected by endpoint network. To reduce this dependency, host delay and DC latency (e.g., delay caused by the server side of a network) may replace ICA RTT. Failed sessions may be given a score of the zero when calculating the weighted average. The machine selector 522 may calculate the scores for the machines using the weighted averages of different parameters, label feature vectors with the parameters from which the machine selector 522 calculated the weighted averages, and then use a loss function and back propagation techniques to train the machine learning model to calculate scores for machines for hosted sessions.

In some implementations, the training data may include user account identifiers and/or application identifiers identifying the user accounts and/or applications that are accessing the hosted sessions for which the training data was generated. Such identifiers may be or include alphanumeric identifiers that uniquely identify the applications or user accounts accessing machines for hosted sessions. By including such identifiers in the training data, the machine selector 522 may train the machine learning model to calculate scores not only based on the machines' performance, but also on how the machines perform during hosted sessions for specific individual users and/or applications. Such training can be used to account for inputting the account and/or application identifiers of accounts and/or applications that are currently accessing hosted sessions and/or for accounts and/or applications that are requesting to access a hosted session.

The machine selector 522 may select the machine to cause to connect to the client device 504 based on the calculated scores. For example, upon calculating the scores for the different machines 506-510, the machine selector 522 may compare the calculated scores with each other. Based on the comparison, the machine selector 522 may identify the machine for which the machine learning model generated a highest score. The machine selector 522 may select the machine with the highest score responsive to determining the machine has the highest score. In this way, the machine selector 522 may select the machine that the machine selector 522 predicted will provide the best user experience to connect with a client device for a hosted session In some cases, the machine selector 522 may determine each of the calculated scores do not satisfy a threshold (e.g., a defined threshold). The threshold may indicate a minimum user experience score that an administrator finds acceptable for hosted sessions. The machine selector 522 may compare the calculated scores to the defined threshold. Responsive to determining each of the calculated scores does not exceed or are less than the threshold, the machine selector 522 may generate an alert. The alert may indicate a machine could not be selected and/or that further machines may need to be added to provide the load balancing server with further candidate machines. The machine selector 522 may transmit the alert to the client device 504 and/or a computer accessed or associated with an administrator.

In some implementations, the machine selector 522 may flag machines for which the machine selector 522 consistently calculates low scores. For example, the machine selector 522 may maintain a list of calculated scores for the machines 506-510. The machine selector 522 may add scores to the list at each instance in which the machine selector 522 calculates new scores for a hosted session. The machine selector 522 may compare the scores to a threshold. Responsive to a defined number of sequentially calculated scores being lower than the threshold, the machine selector 522 may generate a record (e.g., a file, document, table, listing, message, notification, etc.) identifying the machine associated with the score. The machine selector 522 may transmit the record to a computer accessed by an administrator to indicate the machine is experiencing technical issues and may need to be updated by a technician or otherwise removed from consideration as a machine to provide hosted sessions.

In one example, if the machine selector 522 calculates a score below a threshold for the same machine four (or another number) times in a row. In response, the machine selector 522 may generate an alert identifying the machine and send the alert to an administrative device. The machine selector 522 may insert an indication in memory with a stored association with identifiers of the low performing machines. The metric calculator 520 may not calculate metrics for machines with such identifiers and the machine selector 522 may not calculate scores or resource costs with the identifiers. Accordingly, the identifiers may reduce the processing requirements of performing the systems and methods described herein.

In some implementations, the machine selector 522 may select the machine based on the costs (e.g., the resource costs, such as electricity costs, memory costs, bandwidth costs, etc.) of running or executing the machine. The machine selector 522 may do so, for example, in response to identifying a set of scores for the machines calculated as described above that are within a defined threshold or defined range of each other, or that otherwise satisfy another criterion. For example, when comparing the scores for the different machines with each other, the machine selector 522 may identify multiple scores that exceed a threshold and that are within a defined range of each other (e.g., each score is within a defined range of 10 or another number of each other). The machine selector 522 may determine the scores satisfy a stored criterion based on the identification. Responsive to determining the scores satisfy the stored criterion, the machine selector 522 may identify the machine identifiers of the machines with scores that satisfy the stored criterion. The machine selector 522 may use the identified machine identifiers to query memory to identify resource costs of running or executing the machines (e.g., for hosted sessions). In some implementations, the machine selector 522 may retrieve the specifications of machines and calculate resource costs according to the specifications of the machines (e.g., calculate resource costs based on weighted averages of the data in the specifications). The machine selector 522 may compare the retrieved or calculated resource costs with each other and identify the machine that corresponds to the lowest resource cost based on the comparison. The machine selector 522 may select the machine that corresponds to the lowest resource cost.

In some implementations, the machine selector 522 may assign costs of zero or null values to machines (e.g., the machines with scores that satisfy the stored criterion) that are already hosting one or more hosted sessions or that are otherwise already running. In such implementations, responsive to the machine selector 522 only assigning one machine a resource cost of zero, the machine selector 522 may automatically select the one machine because the resource cost is the lowest of the machines for which scores satisfied the criterion. Responsive to the machine selector 522 assigning multiple zero or null values to machines for already hosting one or more hosted sessions, the machine selector 522 may identify and select the machine that is associated with the highest score of the machines assigned the zero or null values. Accordingly, the machine selector 522 may account for machines that are already running and hosting hosted sessions and that may not incur any further resource costs to the aggregate resource cost of the machines that host hosted sessions because it would not require a new machine to begin running.

In some implementations, the machine selector 522 may execute an optimization function (e.g., a Lagrange multiplier function) to select the machine to host a hosted session for the client device 504. The machine selector 522 may execute the optimization function using the scores and the resource costs of all of the machines or only the machines that correspond to scores that satisfied a stored criterion. The optimization function may be any optimization function as configured by an administrator of the load balancing server 502. The machine selector 522 may insert the scores and the resource costs of the machines into the optimization function as input score-resource cost pairs and compare the outputs. The machine selector 522 may select the score-resource cost pair that maximizes the optimization function and identify the machine (e.g., the machine identifier) that corresponds to the score-resource cost pair. The machine selector 522 may select the machine or the machine identifier that corresponds to the score-resource cost pair that maximizes the optimization function.

The connection controller 524 may comprise instructions executable by one or more processors (e.g., the processor 514) that cause the processors to cause client devices to connect to machines for hosted sessions. The connection controller 524 may cause the client device 504 to connect to the selected machine responsive to the machine selector 522 selecting the machine (e.g., selecting the machine based on the score of the machine, the resource cost of the machine, and/or the optimization function based on the score and resource cost of the machine). The connection controller 524 may identify a machine identifier or address of the selected machine and cause the client device to connect with the connected machine.

In some implementations, the connection controller 524 may cause the client device 504 to connect to the selected machine by transmitting a machine identification 530 corresponding to the selected machine to the client device 504. The connection controller 524 may retrieve the machine identification 530 from memory responsive to the metric calculator 520 selecting the machine that corresponds to the machine identification 530. The connection controller 524 may transmit the machine identification 530 to the client device 504. Responsive to receiving the machine identification 530, the client device 504 may transmit a connection request 532 to the machine 506 that corresponds to the machine identification 530. The machine 506 may receive the connection request 532 and establish a connection with the client device 504 (e.g., perform a handshaking protocol establishing a connection with the machine 504). Responsive to establishing the connection, the machine 506 may host a hosted session for the client device 504 over the established connection. In this way, the connection controller 524 may cause the client device 504 to establish a connection with a machine for a hosted machine that the machine selector 522 selected as providing a high-quality user experience and/or while minimizing a resource cost increase that may be incurred when the machine begins hosting the hosted session.

In some implementations, the connection controller 524 may cause the client device 504 to connect to the selected machine. The connection controller 524 may do so by transmitting a message to the selected machine identifying the client device 504 or an address of the client device 504. For example, the connection controller 524 may retrieve an identifier or address (e.g., IP address or MAC address) of the client device 504 from memory or from the connection request 528. The connection controller 524 can transmit the identifier or address to the machine 506 responsive to selecting the machine 506. Responsive to receiving the identifier of the client device 504, the machine 506 may transmit a connection request to the client device 504 and establish a connection with the client device 504 (e.g., perform a handshaking protocol establishing a connection with the machine 504). Responsive to establishing the connection, the machine 506 may host a hosted session for the client device 504 over the established connection.

In some implementations, the connection controller 524 may cause the client device 504 to connect to the selected machine by operating as an intermediary device. For example, the connection controller 524 may assign or establish a connection with the machine 506 the load balancing server 502 selected to host the client device 504 for the hosted session. Accordingly, during the hosted session, the client device 504 may provide inputs to the load balancing server 502. The load balancing server 502 may receive the inputs and forward the inputs to the machine 506. The machine 506 may process the inputs and update a user interface of the hosted session based on the inputs. The machine 506 may transmit the user interface to the load balancing server 502 and the load balancing server 502 may forward the user interface to the client device 504.

Figure 6:
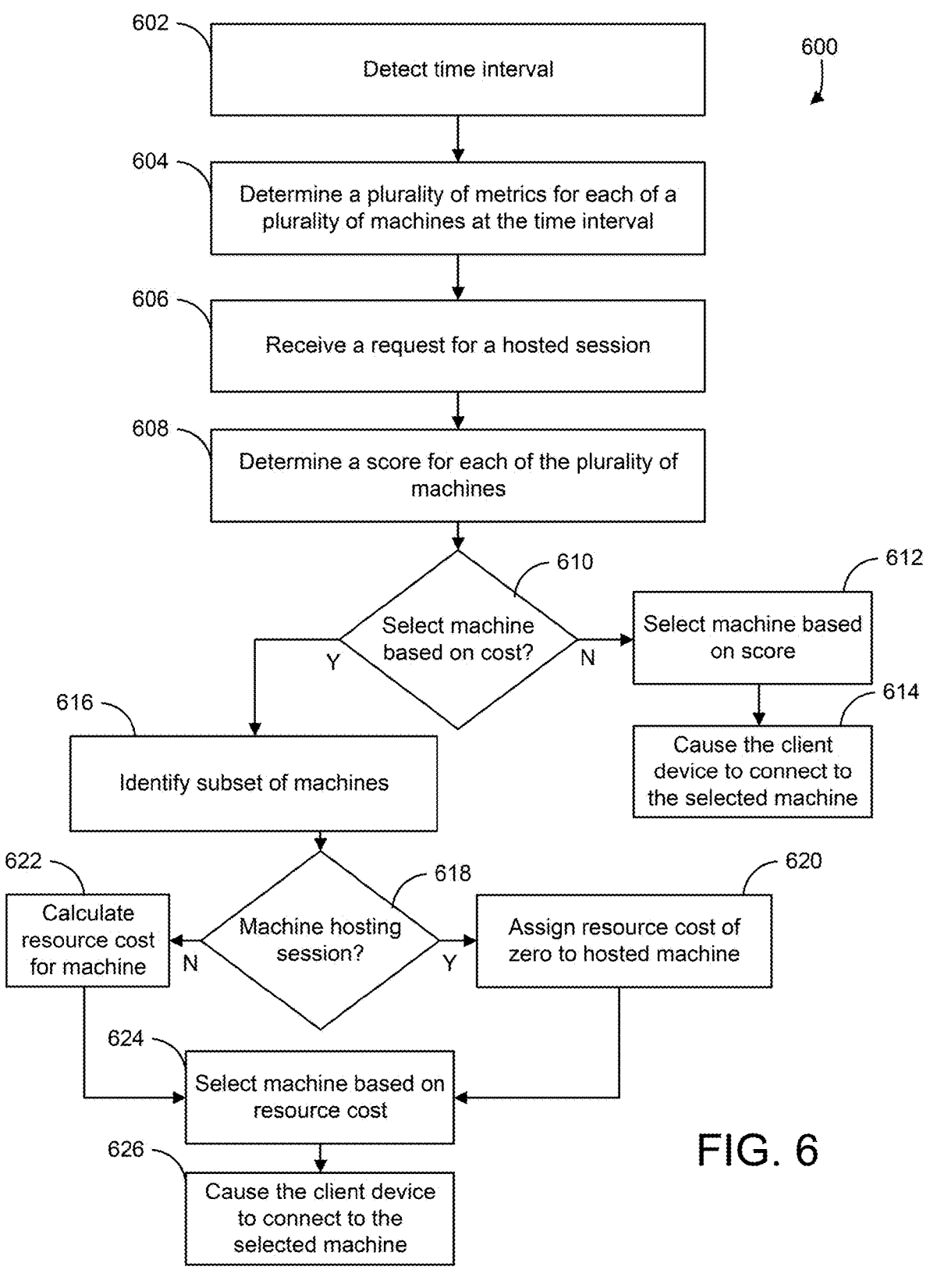
FIG. 6 is a flow diagram of a method for intelligent load balancing of hosted sessions, in accordance with an illustrative embodiment.

FIG. 6 is a flow diagram of a method for intelligent load balancing of hosted sessions, in accordance with an illustrative embodiment, in accordance with an illustrative embodiment. The functionalities of method 600 may be implemented using, or performed by, a data processing system (e.g., the client 102, the server 106, the appliance 200, or the load balancing server 502). In brief overview, the data processing system may determine metrics of different machines indicating the computer resources the machines are currently using (e.g., the computer resources the machines are currently using to host hosted virtual desktop sessions (e.g., hosted sessions)). The data processing system may receive a request from a client device to connect with one of the machines for a hosted session. The data processing system may determine a score for each of the machines based on the metrics for the machine and other parameters regarding the machine and/or the client device or application executing on the client device that transmitted the request. The data processing system may compare the scores of the machines. The data processing system may select the machine that corresponds to the highest score based on the comparison. In some instances, the data processing system may identify a subset of machines that correspond to scores within a threshold of each other. In such instances, the data processing system may calculate resource costs of the machines and execute an optimization function using the resource costs and the scores for the individual machines (e.g., the machines of the subset) to identify the machine that optimizes the optimization function. The data processing system may select the machine that optimizes the optimization function. The data processing system may cause the client device to connect with the selected machine. The data processing system can repeat this process each time a client device transmits a connection request to the data processing system. By performing the method 600, the data processing system may select the machines to connect to client devices based on real-time metrics and/or parameters. Accordingly, the data processing system may proactively and continuously balance the load of hosting hosted sessions across machines and/or applications executing on the machines to improve the performance of the machines and/or applications and the user experience of the hosted sessions.

At operation 602, the data processing system may detect a time interval. The data processing system may detect the time interval by detecting the end of the time interval. To do so, the data processing system may store and maintain an internal clock. The data processing system may also store interrupts configured to cause the data processing system to detect when different time intervals are over. The data processing system may detect a time interval upon executing an interrupt indicating a time interval is over.

At operation 604, the data processing system may determine or calculate a plurality of metrics (e.g., expected CPU utilization, expected disk utilization, and expected memory utilization) for each of a plurality of machines (e.g., machines owned by a common tenant or organization). The data processing system may determine the plurality of metrics responsive to detecting the interval is over. To do so, for example, the data processing system may execute a plurality of machine learning models. Each machine learning model may be configured to calculate a different metric. The data processing system may generate feature vectors with parameters that correspond to the respective metrics (e.g., generate a feature vector for a machine learning model configured to calculate a CPU utilization metric from machine parameters that correspond to recent CPU utilization usage at the machine, generate a feature vector for a machine learning model configured to calculate a memory utilization metric from machine parameters that correspond to recent memory utilization at the machine, etc.), and other parameters, such as the current number of hosted sessions the machine is hosting, identifications of the client devices connected to the hosted sessions, identifications of the accounts accessing the hosted sessions, day of the week, the current time or time interval, the date, etc. The data processing system may generate feature vectors using parameters from the time interval the data processing system detected as being over and do so for each of the machine learning models. The data processing system may generate such feature vectors for a plurality of machines that are configured to host hosted sessions. The data processing system may execute the machine learning models using the feature vectors to calculate metrics for each of the machines.

At operation 606, the data processing system may receive a request for a hosted session. The data processing system may receive the request from a client device. The request may include an identification of the client device, an identification of the application executing on the client device that caused the client device to transmit the request, a timestamp (e.g., a time in which the client device generated or transmitted the request) and/or an identification of a user account with the application that a user accessed to cause the client device to transmit the request.

At operation 608, the data processing system may determine or calculate a score for each of the plurality of machines. The data processing system may determine or calculate the score for each of the plurality of machines based on the calculated metrics for the machine (e.g., the calculated metrics that correspond to a timestamp closest to the current time or the time of receipt of the request), the account identifier of the account that caused the client device to transmit the request, the application identifier of the application of the account, the current time of day, and other parameters regarding the respective machines. The data processing system may generate a feature vector from the parameters, metrics, and data from the request for each respective machine. The data processing system may execute a machine learning model using each feature vector to calculate a score for each machine. In this way, the data processing system may determine scores that indicate the expected user experiences if the data processing system were to cause the requesting client device to connect to the different machines for a hosted session.

At operation 610, in some implementations, the data processing system may determine whether to select the machine based on the cost (e.g., the resource cost) of the machine. The data processing system may do so, for example, based on a configuration of the data processing system indicating whether to select the machine based on the resource cost of the machine. In some implementations, the data processing system may instead do so based on whether one or more of the scores satisfy a criterion. For example, the data processing system may determine if scores are within a threshold of each other. The data processing system may determine if scores are within a threshold of each other by determining if the scores are within a range having a defined size with each other. For instance, the data processing system may compare the determined scores with each other. The data processing system may identify the highest score and any scores that are within a range with a defined size of the highest score. If there are not any scores within a range of the highest score, at operation 612, the data processing system may select the machine that corresponds to the highest score.

In another example, the data processing system may determine to select a machine based on resource cost if there are multiple scores that exceed a threshold (e.g., a defined threshold). The data processing system may compare each machine to the threshold and maintain and increment a counter for each score that exceeds the threshold. The data processing system may determine if the count of the counter exceeds one and determine to select the machine based on the cost of the machine responsive to the count exceeding one. Otherwise, at operation 612, the data processing system may select the machine that corresponds to the score that exceeds the threshold.

To select the machine at operation 612, the data processing system may select an identifier of the machine from memory. The data processing system may identify the identifier of the machine that corresponds to the score from memory based on a stored association between the identifier and the score in memory. The data processing system may then select the identified identifier.

At operation 614, the data processing system may cause the client device to connect to the selected machine. The data processing system may do so, for example, by transmitting an identifier or address of the selected machine to the client device. The client device may receive the identifier or address and establish a connection with the selected machine for a hosted session based on the identifier or address. In another example, the data processing system may transmit an identifier of the requesting client device to the selected machine. The data processing system may transmit a message to the selected machine containing the identifier. The machine may receive the identifier and establish a connection with the client device and provide the client device with a hosted session.

If at operation 610 the data processing system determines to select the machine based on the resource cost of the machines (e.g., based on resource costs incurred by hosting new hosted sessions by the machines), at operation 616, the data processing system may identify a subset of the machines. The data processing system may identify the subset of machines that satisfied the criteria (e.g., correspond to scores that exceed a threshold, correspond to scores that are within a defined range of the highest scoring machine, etc.). The data processing system may identify identifications of the subset of machines from memory to identify the subset of machines.

At operation 618, the data processing system may determine if any of the subset of machines is currently hosting a hosted session. The data processing system may query the machines of the subset requesting a status indicating whether the machines are hosting a hosted session. The machines may each respond to a query with an indication of whether the machine is hosting a hosted session. The data processing system may label the identifications of the subset of machines to indicate which machines are currently hosting a hosted session.

For each machine that is currently hosting a hosted session, at operation 620, the data processing system may assign a resource cost of zero to the machine. The data processing system may assign the resource costs to the machine by storing an association between the identification of the machine and a value of zero. The data processing system may do so because the machines are already running and hosting other hosted sessions for client devices. Therefore, hosting another hosted session may not cause the machines to begin running or incur any new resource costs.

For each machine that is not currently hosting a hosted session, at operation 622, the data processing system may calculate or determine a resource cost of the machine. The data processing system may calculate the resource cost of the machines by retrieving the specifications for the machines from memory. In some cases, the specifications may indicate the resource costs of hosting a hosted session or otherwise running. In such cases, the data processing system may calculate the resource costs for the machine by retrieving the resource costs from the specifications. In some cases, the specifications may indicate characteristics of the machines such as the CPU, memory, and/or disk resources of the machines. The data processing system may execute a function using the characteristics as input (e.g., assign weights to the values for CPU, memory, and/or disk resources and aggregate or multiply the weighted values) to calculate a resource cost for each machine.

At operation 624, the data processing system may select the machine based on the resource cost. The data processing system may do so by comparing the resource costs for the machines with each other. The data processing system may select the machine that corresponds to the lowest resource cost.

In some embodiments, the data processing system may select the machine based on the resource costs for the machines and the scores for the machines. The data processing system may do so using an optimization function. For example, the data processing system may insert resource costs and scores that correspond to the same machines as score-resource cost pairs into the optimization function. The data processing system may select the machine that corresponds to the score-resource cost pair that optimizes the optimization function.

At operation 626, the data processing system may cause the client device to connect to the selected machine. The data processing system may do so in the same or a similar manner to the manner described with respect to the operation 614.

Figure 7:
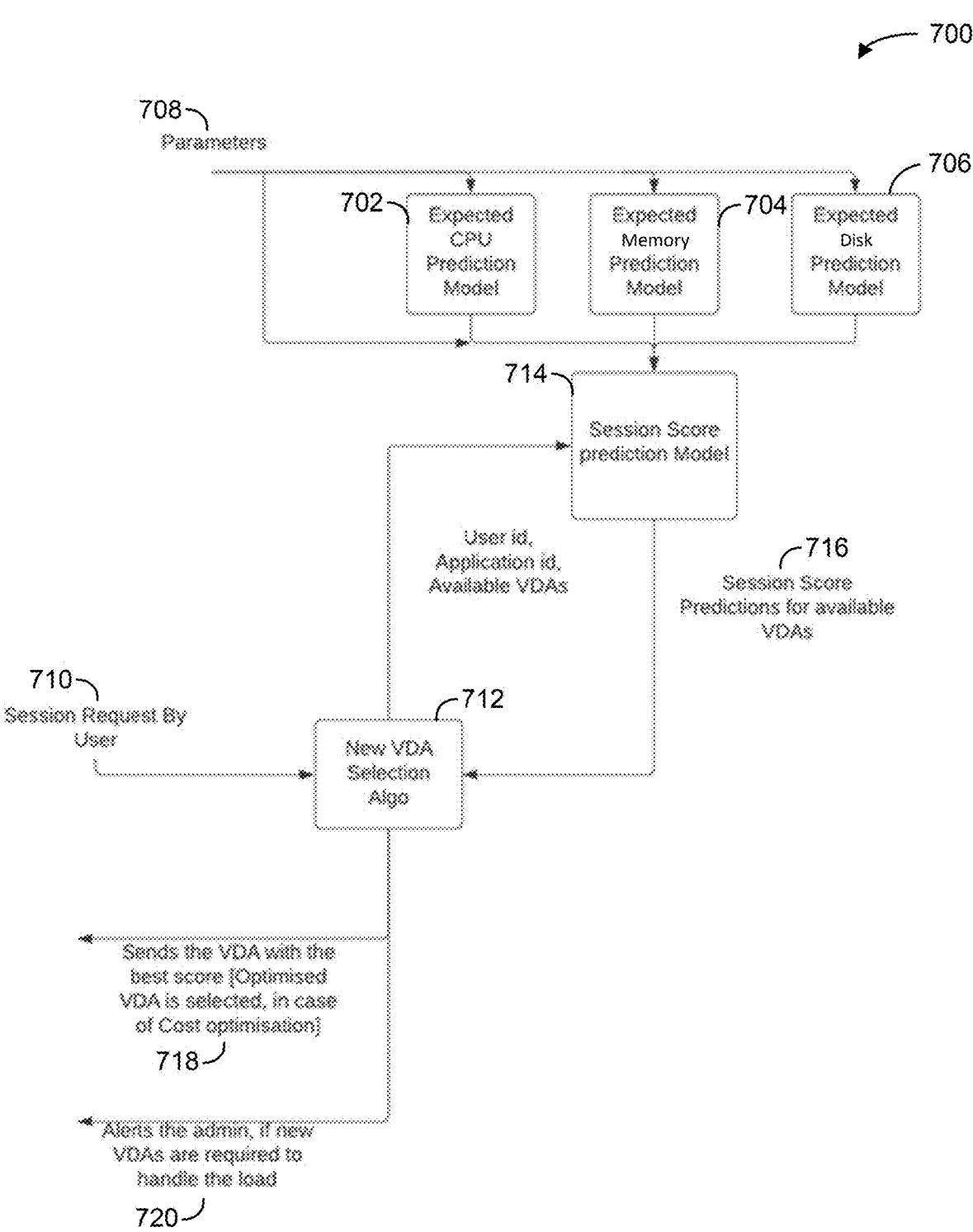
FIG. 7 is a sequence diagram of a sequence for intelligent load balancing of hosted sessions, in accordance with an illustrative embodiment.

FIG. 7 is a sequence diagram of a sequence 700 for intelligent load balancing of hosted sessions, in accordance with an illustrative embodiment. The functionalities of the system executing the sequence 700 may be implemented using, or performed by, a data processing system (e.g., the client 102, the server 106, the appliance 200, or the load balancing server 502). The data processing system may implement the sequence 700 on a periodic basis, and/or on an on-demand basis in response to receiving a connection request from a client device.

In the sequence 700, the data processing system may periodically calculate metrics for different machines that are configured to host hosted sessions for client devices. The data processing system may calculate the metrics using an expected CPU prediction model 702, an expected memory prediction model 704, and an expected disk prediction model 706. Each of the models 702-706 may be a machine learning model configured to calculate a metric indicating a predicted state of a machine (e.g., a predicted CPU utilization, a predicted memory utilization, and an expected disk utilization) for a time interval. The data processing system may do so by generating feature vectors from parameters 708 regarding the different metrics and the current state of the machine, as described herein. The data processing system may execute the feature vectors with the respective models 702-706 to generate metrics for the machines at defined intervals.

The data processing system may receive a session request (e.g., a request for a hosted session) from a client device. The session request may include an identification of an account associated with a user who initiated the session request, and an identification of the application associated with the account. The data processing system may execute a machine selection algorithm 712 to generate a feature vector with the identification of the account, the identification of the application, metrics that were most recently generated by the models 702-706, and one or more of parameters 708 for each of the machines or each machine that is available (e.g., each machine that is not at usage capacity or that has not been removed from consideration or flagged for not being capable of providing hosted sessions with a high-quality user experience). The machine selection algorithm 712 may execute a session score prediction model 714 with each of the feature vectors to generate scores (e.g., session scores or user experience scores) 716 for the machines.

The machine selection algorithm 712 may evaluate the scores to determine which machine to select or whether to generate and transmit an alert indicating no machine could be selected. For example, in some cases, the machine selection algorithm 712 may identify the machine associated with the highest score and/or that exceeds a threshold and transmit an identification 718 of the identified machine to the requesting client device. In some cases, the machine selection algorithm 712 may select an optimized machine based on a score of the machine satisfying a criterion (e.g., exceeding a threshold and/or being within a threshold of the highest score) and having a score-resource cost pair that optimizes a cost function. In some cases, the machine selection algorithm 712 may determine the scores or resource costs of the machines do not satisfy a criterion (e.g., a defined threshold). In such cases, the data processing system may generate and transmit an alert to an administrator computing device indicating one or more new machines are required to provide hosted sessions or that the current machines require maintenance to provide better user experiences for hosted sessions.

Accordingly, the systems and methods discussed herein provide for intelligent load balancing of hosted sessions. A load balancing server may use a variety of different parameters and a hierarchical machine learning architecture to calculate scores for different machines. The scores may indicate the user experiences the machines will provide in a hosted session in response to a request for a hosted session from a client device. The load balancing server may identify a machine that has the highest score or that otherwise optimizes an optimization function in combination with the resource cost of the machine as the machine provides a hosted session to the requesting client device. The load balancing server may perform these techniques in real-time on a per-request basis to enable individual machines to access hosted sessions that provide a high-quality user experience. Thus, the load balancing server may improve and/or maintain performance of the machines as the machines provide hosted sessions over time by avoiding only routing session requests to machines based on the number of hosted sessions the machines are currently hosting. Instead, the load balancing server may optimize the resource usage of the machines and reduce errors that may occur in machines that are burdened with hosting too many hosted sessions.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein. Terms such as "first" and "second" are not intended to imply any particular order unless otherwise noted, and are primarily used to distinguish items from each other—e.g. a second item may temporally occur prior to a first item.

It will be further understood that various changes in the details, materials, and arrangements of the parts that have been described and illustrated herein may be made by those skilled in the art without departing from the scope of the following claims.

What is claimed is:

1. A method, comprising:
determining, by one or more processors, a plurality of metrics for each of a plurality of machines configured to connect client devices with hosted sessions;
receiving, by the one or more processors from a client device, a request to establish a connection with one of the plurality of machines to access a hosted session;
determining, by the one or more processors, a score for each of the plurality of machines based at least on the plurality of metrics for each of the plurality of machines;
selecting, by the one or more processors, a machine from the plurality of machines as a function of the score and a resource cost of the machine; and causing, by the one or more processors, the client device to connect to the selected machine for the hosted session;
assigning, by the one or more processors, resource costs of zero to a subset of the plurality of machines responsive to each machine of the subset currently hosting a hosted session; and
calculating, by the one or more processors, a cost for each machine of the plurality of machines other than the subset assigned the resource costs of zero based on machine specifications of computing devices executing each machine of the plurality of machines other than the subset.

2. The method of claim 1, wherein determining the plurality of metrics for each of the plurality of machines comprises determining, by the one or more processors, memory utilization, central processing unit utilization, and disk usage utilization for each of the plurality of machines.

3. The method of claim 1, wherein determining the plurality of metrics for each of the plurality of machines comprises:
determining, by the one or more processors, metrics for each of the plurality of machines over time at defined intervals; and
determining, by the one or more processors, the plurality of metrics at an interval of the defined intervals.

4. The method of claim 1, wherein determining the score for each of the plurality of machines based on the plurality of metrics comprises determining, by the one or more processors, the score for each of the plurality of machines based on the plurality of metrics responsive to the plurality of metrics being determined at a most recent interval of the defined intervals.

5. The method of claim 1, wherein determining the plurality of metrics comprises determining, by the one or more processors, the plurality of metrics based on a current time of the day and historical user activity at the current time of the day.

6. The method of claim 1, wherein determining the score for each of the plurality of machines comprises determining, by the one or more processors, the score based further on an account identifier of an account accessing the client device that transmitted the request.

7. The method of claim 1, wherein determining the score for each of the plurality of machines comprises determining, by the one or more processors, the score based further on an application identifier of an application executing on the client device that transmitted the request to establish the connection.

8. The method of claim 1, wherein selecting the machine comprises selecting, by the one or more processors, the machine responsive to determining the score and the resource cost of the machine optimizes an optimization function.

9. The method of claim 1, further comprising:
determining, by the one or more processors, a subset of the plurality of machines with scores that are below a threshold; and
removing, by the one or more processors, the subset of the plurality of machines as options from which to select prior to selecting the machine.

10. The method of claim 1, further comprising:
determining, by the one or more processors, a second plurality of metrics for each of the plurality of machines;

receiving, by the one or more processors from a second client device, a second request to establish a connection with one of the plurality of machines to access a hosted session;

determining, by the one or more processors, a second score for each of the plurality of machines based on the second plurality of metrics for each of the plurality of machines;

determining, by the one or more processors, each of the second scores is below a threshold; and responsive to determining each of the second scores is below the threshold, transmitting, by the one or more processors, an alert to an administrator device indicating each of the second scores is below the threshold.

11. The method of claim 1, wherein the plurality of machines are a subset of a set of machines configured to host sessions, further comprising:

identifying, by the one or more processors, the plurality of machines from the set of machines responsive to each machine of the plurality of machines corresponding to a score within a threshold of each other, wherein selecting the machine from the plurality of machines as a function of the score and the resource cost of the machine comprises selecting, by the one or more processors, the machine as a function of the resource cost of the machine responsive to determining the plurality of machines correspond to scores within the threshold of each other.

12. The method of claim 1, determining the score for each of the plurality of machines comprises:

concatenating, by the one or more processors, the plurality of metrics, an account identifier of an account accessed at the client device that transmitted the request, and an application identifier of a first application executing on the client device that transmitted the request to generate a feature vector; and executing, by the one or more processors, a machine learning model using the feature vector as input to determine the score for each of the plurality of machines.

13. A system, comprising:

a computing device comprising a processor coupled to memory and a network interface, the one or more processors configured to:

determine a plurality of metrics for each of a plurality of machines configured to connect computers with hosted sessions;

receive, from a client device, a request to establish a connection with one of the plurality of machines to access a hosted session;

determine a score for each of the plurality of machines based at least on the plurality of metrics for each of the plurality of machines;

select an machine from the plurality of machines as a function of the score and a resource cost of the machine; and cause the client device to connect to the selected machine for the hosted session;

assign resource costs of zero to a subset of the plurality of machines responsive to each machine of the subset currently hosting a hosted session; and calculate a cost for each machine of the plurality of machines other than the subset assigned the resource costs of zero based on machine specifications of computing devices executing each machine of the plurality of machines other than the subset.

14. The system of claim 13, wherein the processor is configured to determine the plurality of metrics for each of the plurality of machines by determining memory utilization, central processing unit utilization, and disk usage utilization for each of the plurality of machines.

15. The system of claim 13, wherein the processor is configured to determine the plurality of metrics for each of the plurality of machines by:

determining metrics for each of the plurality of machines over time at defined intervals; and determining the plurality of metrics at an interval of the defined intervals.

16. The system of claim 13, wherein the processor is configured to determine the score for each of the plurality of machines based on the plurality of metrics by determining the score for each of the plurality of machines based on the plurality of metrics responsive to the plurality of metrics being determined at a most recent interval.

17. The system of claim 13, wherein the processor is configured to determine the plurality of metrics by determining the plurality of metrics based on a current time of the day and historical user activity at the current time of the day.

18. A method, comprising:

determining, by one or more processors processor, a plurality of metrics for each of a plurality of machines configured to connect client devices with hosted sessions;

receiving, by the one or more processors from a client device, a request to establish a connection with one of the plurality of machines to access a hosted session;

determining, by the one or more processors, a score for each of the plurality of machines based on the plurality of metrics for each of the plurality of machines;

selecting, by the one or more processors, an machine from the plurality of machines as a function of the score for the machine; and causing, by the one or more processors, the client device to connect to the selected machine for the hosted session;

concatenating, by the one or more processors, the plurality of metrics, an account identifier of an account accessed at the client device that transmitted the request, and an application identifier of a first application executing on the client device that transmitted the request to generate a feature vector; and executing, by the one or more processors, a machine learning model using the feature vector as input to determine the score for each of the plurality of machines.

19. The method of claim 18, wherein determining the plurality of metrics for each of the plurality of machines comprises determining memory utilization, central processing unit utilization, and disk usage utilization for each of the plurality of machines.

* * * * *